(12) United States Patent
Zappacosta et al.

(10) Patent No.: US 9,177,056 B2
(45) Date of Patent: Nov. 3, 2015

(54) METHOD AND APPARATUS FOR A TRUSTED LOCALIZED PEER-TO-PEER SERVICES MARKETPLACE

(75) Inventors: Marco Zappacosta, San Francisco, CA (US); Jeremy Tunnell, San Francisco, CA (US); Alexander Daniels, Washington, DC (US); Jonathan Swanson, San Francisco, CA (US)

(73) Assignee: THUMBTACK, INC., San Francisco, CA (US)

(*) Notice: Subject to any disclaimer, the term of this patent is extended or adjusted under 35 U.S.C. 154(b) by 134 days.

(21) Appl. No.: 12/652,728

(22) Filed: Jan. 5, 2010

(65) Prior Publication Data
US 2010/0174727 A1   Jul. 8, 2010

Related U.S. Application Data

(60) Provisional application No. 61/142,863, filed on Jan. 6, 2009.

(51) Int. Cl.
*G06F 17/30* (2006.01)
*G06Q 30/00* (2012.01)

(52) U.S. Cl.
CPC .......... *G06F 17/30864* (2013.01); *G06Q 30/00* (2013.01)

(58) Field of Classification Search
CPC .... G06Q 30/06; G06Q 50/01; G06Q 30/0621
USPC ........ 707/706, 758, 769, 723, 724, 754, 768; 705/26.1, 26.5, 26.61, 321, 40, 80, 705/26.35, 14.71; 715/200, 733
See application file for complete search history.

(56) References Cited

U.S. PATENT DOCUMENTS

| | | | |
|---|---|---|---|
| 7,187,932 B1* | 3/2007 | Barchi | 455/445 |
| 7,430,555 B2* | 9/2008 | Sealand et al. | 1/1 |
| 7,725,477 B2* | 5/2010 | Wiseman | 707/758 |
| 7,818,229 B2* | 10/2010 | Imrey et al. | 705/35 |
| 8,700,614 B1* | 4/2014 | Diller et al. | 707/723 |
| 2001/0032165 A1* | 10/2001 | Friend et al. | 705/37 |
| 2002/0116232 A1* | 8/2002 | Rapp et al. | 705/5 |
| 2003/0061060 A1* | 3/2003 | Tenorio | 705/1 |
| 2003/0126205 A1* | 7/2003 | Lurie | 709/204 |
| 2004/0254821 A1* | 12/2004 | Glaser | 705/7 |
| 2004/0267585 A1* | 12/2004 | Anderson et al. | 705/8 |
| 2005/0010484 A1* | 1/2005 | Bohannon et al. | 705/26 |
| 2005/0021551 A1* | 1/2005 | Silva et al. | 707/102 |
| 2005/0160014 A1* | 7/2005 | Moss et al. | 705/26 |

(Continued)

*Primary Examiner* — MD. I Uddin
(74) *Attorney, Agent, or Firm* — Nicholson de Vos Webster & Elliott LLP

(57) ABSTRACT

A trusted localized peer-to-peer services marketplace including an available search module to search an available services database for available services responsive to receiving a search query from a potential service buyer, a wanted services search module to search a wanted services database for wanted services responsive to a receiving a search query from a service seller, and a display module coupled with the available services search module and the wanted services search module, the display module to display the results of the search queries, the display module further to display an option for the potential service buyer to automatically populate the wanted services database based on the received available services search query, and to display an option for the service seller to automatically populate the available services database based on the received wanted services search query.

16 Claims, 10 Drawing Sheets

(56) References Cited

U.S. PATENT DOCUMENTS

| | | | |
|---|---|---|---|
| 2006/0107046 A1* | 5/2006 | Raley et al. | 713/168 |
| 2008/0109491 A1* | 5/2008 | Gupta | 707/104.1 |
| 2008/0306750 A1* | 12/2008 | Wunder et al. | 705/1 |
| 2009/0070130 A1* | 3/2009 | Sundaresan et al. | 705/1 |
| 2010/0114739 A1* | 5/2010 | Johnston | 705/27 |
| 2010/0153278 A1* | 6/2010 | Farsedakis | 705/80 |

* cited by examiner

FIG. 2

| Buy Services |
| Sell Services |

Post your service and availability

Job Details:

Description

DESCRIPTION FIELD 310

Price

PRICE FIELD 315

Availability:

AVAILABILITY FIELD 320

Payment:

PAYMENT FIELD 325

Location:

LOCATION FIELD 330

Verification:

VERIFICATION FIELD 335

SUBMIT 360

FIG. 3

| | S | M | T | W | TH | F | S |
|---|---|---|---|---|---|---|---|
| 9:00 | | | | | | | |
| 10:00 | | AVAILABLE | | AVAILABLE | | BUSY | |
| 11:00 | | | | AVAILABLE | | BUSY | |
| 12:00 | | | AVAILABLE | | | BUSY | |
| 1:00 | | | | | AVAILABLE | | |
| 2:00 | | | | | | | |
| 3:00 | | | | | | | |
| 4:00 | | | | | | | |

Post your availability

Buy Services
Sell Services

METHOD AND APPARATUS FOR A TRUSTED LOCALIZED PEER-TO-PEER SERVICES MARKETPLACE

CROSS-REFERENCE TO RELATED APPLICATIONS

This application claims the benefit of U.S. Provisional Application No. 61/142,863, filed Jan. 6, 2009, which is hereby incorporated by reference in its entirety.

BACKGROUND

1. Field

Embodiments of the invention relate to the field of online marketplaces; and more specifically to a trusted localized marketplace for peer-to-peer services.

2. Background

Online marketplaces commonly exist for selling goods. For example, auction websites provide a portal for buyers and sellers to meet to buy and sell goods. An attraction of these websites is the ability for sellers (either individuals or businesses) to sell their goods across the country.

Consumers currently have few options for transacting for services online. Certain websites exist that serve as a repository for reviews of business and/or services. These websites do not facilitate the booking and transaction of services. Also, attempts have been made to build out this functionality from a social network, which has the negative effect of pooling results based on social ties as opposed to geographic proximity. Furthermore, few websites have focused on catering to both provider and consumer, choosing instead to tailor their websites to one side of the transaction.

BRIEF DESCRIPTION OF THE DRAWINGS

The invention may best be understood by referring to the following description and accompanying drawings that are used to illustrate embodiments of the invention. In the drawings:

FIG. 2 illustrates an exemplary mechanism for a service buyer to generate a wanted services ad according to one embodiment of the invention;

FIG. 3 illustrates an exemplary mechanism for a service seller to generate an available services ad according to one embodiment of the invention;

FIG. 9 illustrates an exemplary calendaring system used in the trusted localized peer-to-peer services marketplace according to one embodiment of the invention.

DETAILED DESCRIPTION

Figure 1A:
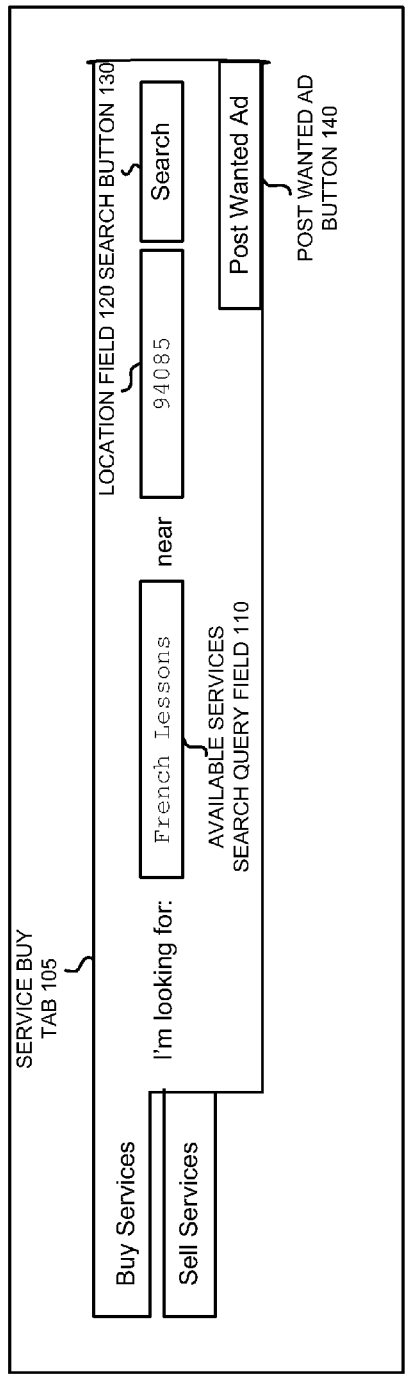
FIG. 1A illustrates an exemplary available services search page of a trusted localized peer-to-peer services marketplace according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The techniques shown in the figures can be implemented using code and data stored and executed on one or more electronic devices. Such electronic devices store and communicate (internally and/or with other electronic devices over a network) code and data using machine-readable media, such as machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as a storage device, one or more user input/output devices (e.g., a keyboard, a touchscreen, and/or a display), and a network connection. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

Figure 1B:
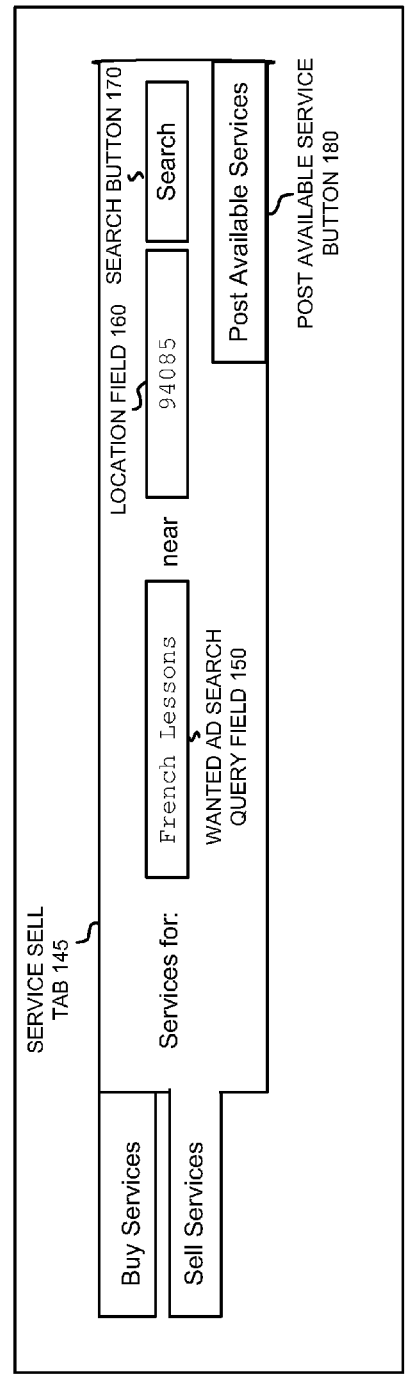
FIG. 1B illustrates an exemplary wanted services search page of a trusted localized peer-to-peer services marketplace according to one embodiment of the invention.

A method and apparatus for a trusted localized marketplace for peer-to-peer services is described. FIGS. 1A and 1B illustrate an exemplary graphical user interface of a trusted localized marketplace for peer-to-peer services according to one embodiment of the invention. According to one embodiment of the invention, FIGS. 1A and 1B are home pages of a trusted localized marketplace for peer-to-peer services. FIGS. 1A and 1B will be described with reference to the operations of FIGS. 4 and 5 respectively. However, it should be understood that the operations of FIGS. 4 and 5 can be performed by embodiments of the invention other than those discussed with reference to FIGS. 1A and 1B, and the embodiments of the invention discussed with reference to FIGS. 1A and 1B can be performed by operations different than those discussed with reference to FIGS. 4 and 5.

FIG. 1A illustrates one example of a graphical user interface for a potential buyer of services to search for available services. The potential service buyer is typically an individual or company wishing to view the services available at a given location and possibly purchasing one or more of those services. The service buyer tab 105 includes an available services search query field 110, a location field 120, a search button 130, and a post wanted ad button 140. The available services search query field 110 allows the potential service buyer to enter in services that the potential service buyer has interest in purchasing. For example, in FIG. 1A, a potential service buyer has entered in "French Lessons" in the available services search query field 110 (thus, the potential service buyer is interested in searching for lessons from French teachers). The location field 120 allows the potential service buyer to enter in a location. Typically, the location indicates where the potential service buyer is located and/or how far the potential service buyer is willing to travel to purchase services. The location may be entered as a city, a street within a city, a zip code, etc. In one embodiment of the invention, when a potential service buyer is logged in, the location field 120 is automatically populated with the address used during registration (which the potential service buyer may change). As illustrated in FIG. 1A, the potential service buyer has entered the zip code 94085 into the location field 120. According to one embodiment of the invention, entry of the location field is mandatory to search for available services. The search button 130, when selected by the potential service buyer, submits the information entered in the available services search query field 110 and/or the information entered in the location field 120 to search an available services database, which is populated with available services. The post wanted ad button 140, when selected by the potential service buyer, directs the potential service buyer to a post wanted services page which will be described in greater detail with reference to FIG. 2.

Of course, it should be understood that other search options may be available for a potential service buyer when searching for available services. For example, the potential service buyer may include search parameters based on price (e.g., the amount the buyer wishes to spend), rating of service sellers, verification of service sellers, availability, etc. It should also be understood that although FIG. 1A illustrates the post wanted ad button 140 included in the service buy tab 105, the post wanted ad button 140 (or a similar button with like functionality) may be located outside of the service buy tab 105. In addition, it should be understood that the number and type of fields illustrated in FIG. 1A is exemplary and alternative embodiments may have more fields, less fields, fields that have combined functionality, etc.

FIG. 1B illustrates one example of a graphical user interface for a potential seller of services to search for wanted services (services wanted by a service buyer). The potential seller of services is typically an individual or company wishing to sell their services at a given location. The service sell tab 145 includes a wanted ad search query field 150, a location field 160, a search button 130, and a post available services button 180. The wanted ad search query field 150 allows the service seller to enter a query to search for services that are currently wanted by potential service buyers (e.g., to search for services the service seller may offer that are currently wanted by potential service buyers). For example, in FIG. 1B, a service seller has entered in "French Lessons" in the wanted ad search query field 150 (e.g., the service seller provides French lessons). The location field 160 allows the service seller to enter in a location. Typically, the location indicates where potential service buyers have indicated they want a service. The location may be entered as a city, a street within a city, a zip code, a state, etc. In one embodiment of the invention, when a service seller is logged in, the location field 160 is automatically populated with the address used during registration (which the service seller may change). As illustrated in FIG. 1B, the service seller has entered the zip code 94085 into the location field 160. According to one embodiment of the invention, entry of the location field is mandatory to search for wanted services. The search button 170, when selected by the service seller, submits the information entered in the wanted ad search query field 150 and/or the location field 160 to perform a search on a wanted services database, which is populated with wanted services. The post available services button 180, when selected by the service seller, directs the service seller to a post available services page which will be described in greater detail with reference to FIG. 3.

Of course, it should be understood that other search options may be available for the potential seller when searching for wanted services. For example, additional search parameters may be included in the search query, including price (e.g., the minimum price the service seller would accept), rating of service buyers, verification of service buyers, availability, etc. It should also be understood that although FIG. 1B illustrates the post available services button 180 included in the service sell tab 145, the post available services button 180 (or a similar button with like functionality) may be located outside of the service sell tab 145. In addition, it should be understood that the number and type of fields illustrated in FIG. 1B is exemplary and alternative embodiments may have more fields, less fields, fields that have combined functionality, etc.

Figure 2:
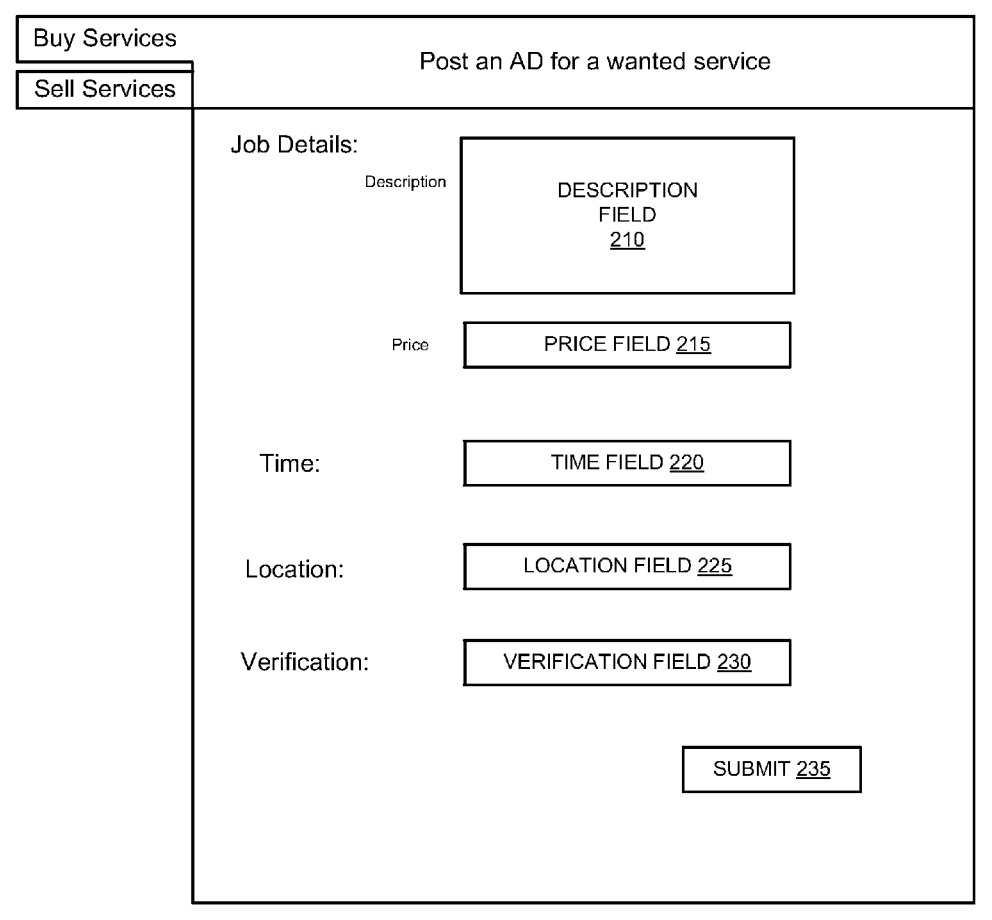

FIG. 2 illustrates an exemplary mechanism for a service buyer to generate a wanted services ad according to one embodiment of the invention. FIG. 2 includes a description field 210, a price field 215, a time field 220, a location field 225, a verification field 230, and submit button 235. It should be understood that the number and type of fields illustrated in FIG. 2 is exemplary and alternative embodiments may have more fields, less fields, fields that have combined functionality, etc.

The description field 210 allows a service buyer to provide a description of the service wanted (e.g., French lessons). The price field 215 allows the service buyer to provide the amount of money they are willing to spend for the service. The time field 220 allows the service buyer to provide the time/date the service is needed. The location field 225 allows the service buyer to provide the location that the service is needed (e.g., in the home of the service buyer, whether the service buyer is willing to travel (e.g., to the site of the service seller), over the Internet or phone, etc.). The verification field 230 allows the service buyer to require a certain verification status for the service sellers (e.g., a verified name, verified email address, verified address, valid background check, etc.). Responsive to the service buyer selecting the submit button 235, a wanted services ad is automatically generated based on the information provided and is populated to the wanted services database. According to one embodiment of the invention, the service buyer must be registered and logged into the trusted localized online peer-to-peer marketplace in order to post an ad for a wanted service.

FIG. 3 illustrates an exemplary mechanism for a service seller to generate an available services ad according to one embodiment of the invention. FIG. 3 includes a description field 310, a price field 315, an availability field 320, a payment field 325, a location field 330, a verification field 335, and a submit button 360. It should be understood that the number and type of fields illustrated in FIG. 3 is exemplary and alternative embodiments may have more fields, less fields, fields that have combined functionality, etc.

The description field 310 allows the service seller to provide a description of the services they are offering. The price field 315 allows the service provider to indicate how much their services cost (e.g., hourly, per job, etc.). The availability field 320 allows the service seller to indicate when they are available to provide their services (e.g., date and time). According to one embodiment of the invention, the service seller may use a calendaring system such that service buyers can view the availability of the service seller and book a time (the calendaring system is interactive). The payment field 325 allows the service seller to indicate the types of payments that are accepted (e.g., cash, checks, PayPal, credit cards, etc.). The location field 330 allows the service seller to indicate where the service will be provided (e.g., the service buyer travels to the seller, the seller travels to the buyer, neither (e.g., service is provided over the phone, Internet, etc.), etc.). The verification field 230 allows the service seller to require a certain verification status for service buyers (e.g., a verified name, verified email address, verified address, verified background check, etc.). Responsive to the service seller selecting the submit button 360, an available service ad is automatically generated based on the information provided and is populated to the available services database. According to one embodiment of the invention, the service seller is required to be registered and logged into the trusted localized online peer-to-peer marketplace in order to post an ad for an available service.

Figure 4:
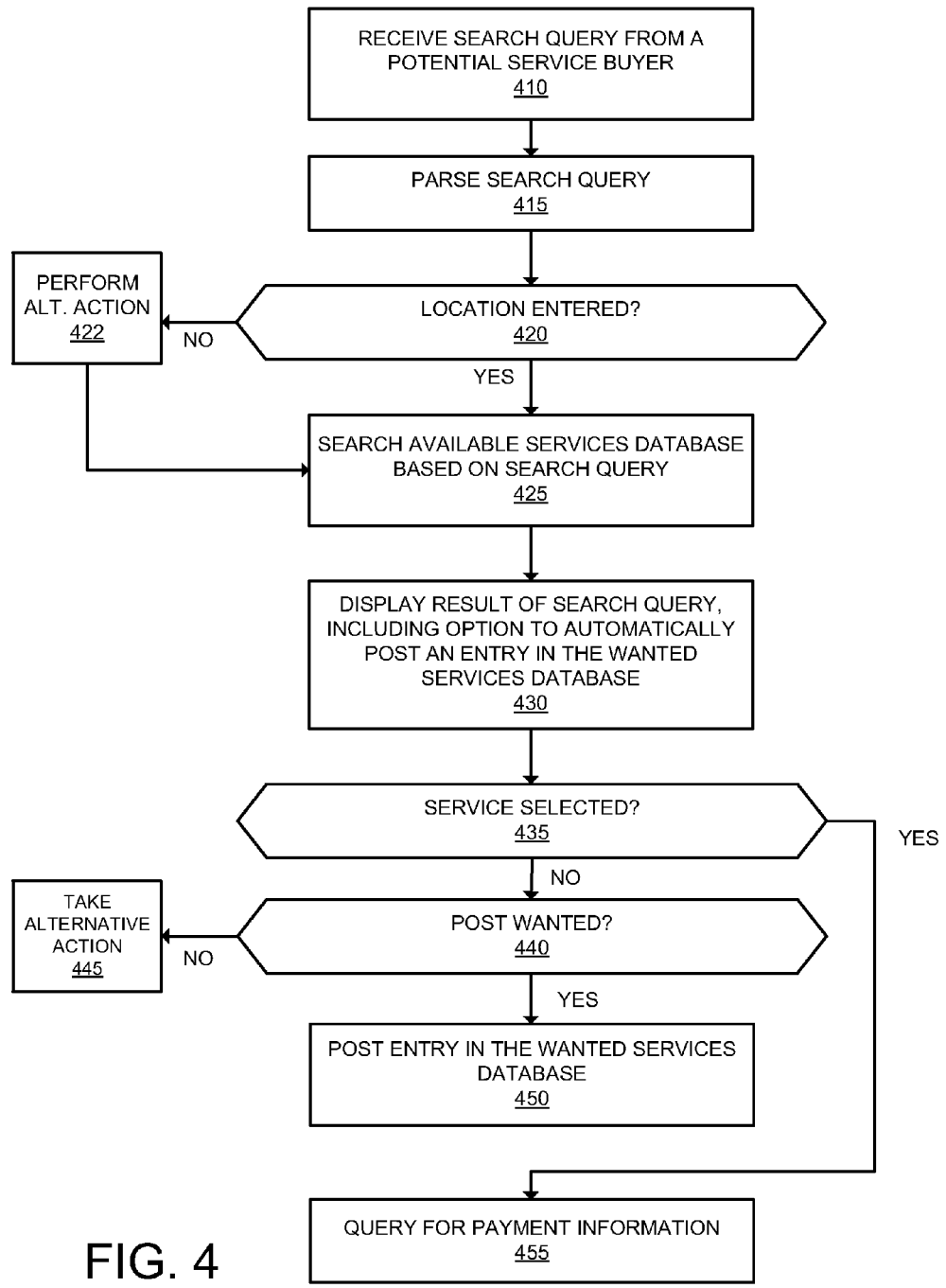
FIG. 4 is a flow diagram illustrating an exemplary method for a service buyer to use the trusted localized peer-to-peer services marketplace according to one embodiment of the invention.

FIG. 4 is a flow diagram illustrating an exemplary method for a service buyer to use the trusted localized marketplace for peer-to-peer services according to one embodiment of the invention. The operations of FIG. 4 will be described with reference to the exemplary embodiment of FIG. 8. However, it should be understood that the operations of FIG. 4 can be performed by embodiments of the invention other than those discussed with reference to FIG. 8, and the embodiments discussed with reference to FIG. 8 can perform operations different than those discussed with reference to FIG. 4.

Figure 8:
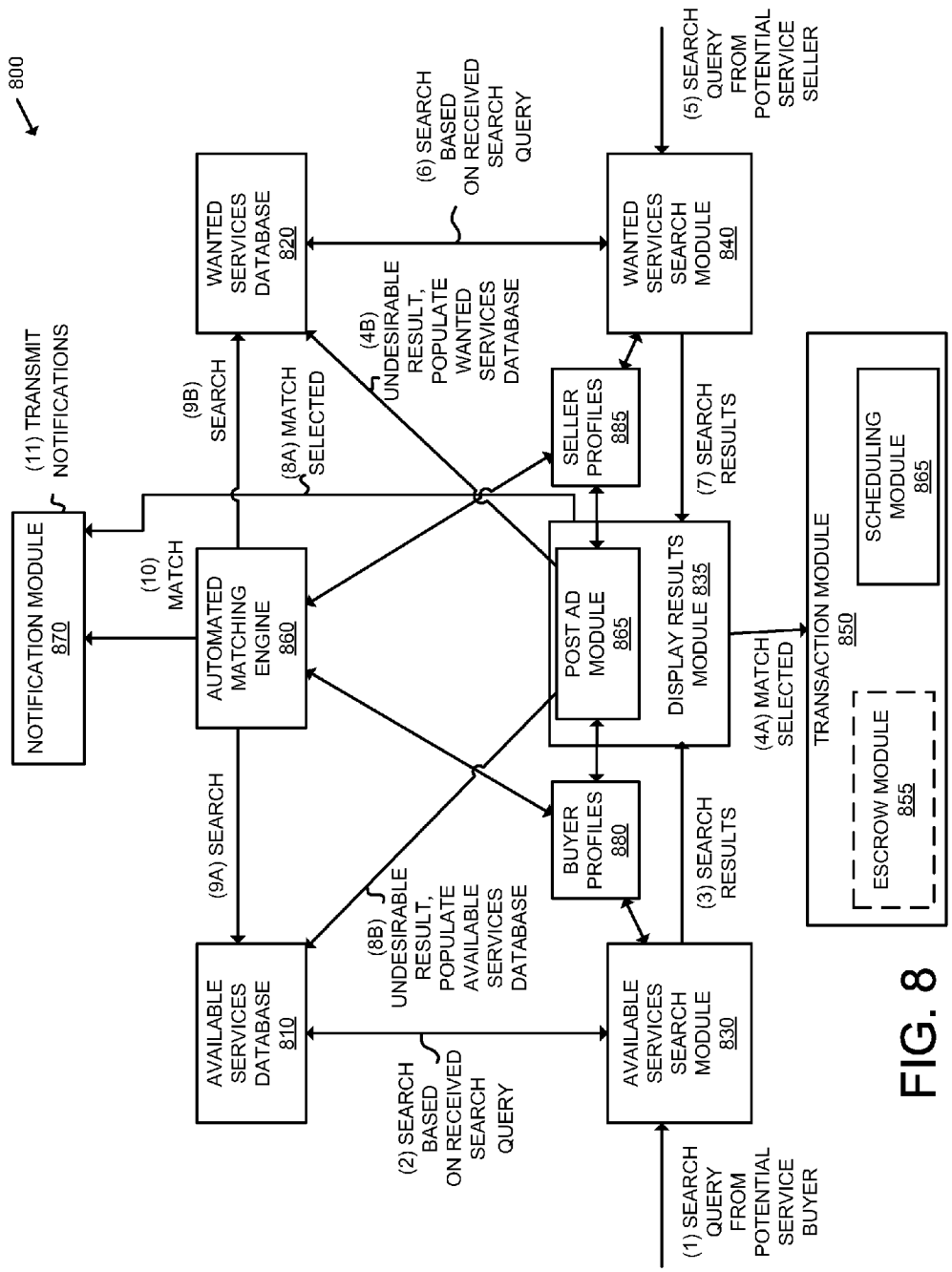
FIG. 8 illustrates an exemplary trusted localized peer-to-peer services marketplace according to one embodiment of the invention.

According to one embodiment of the invention, the trusted localized peer-to-peer services marketplace 800 (illustrated in FIG. 8) performs the operations of FIG. 4. With reference to FIG. 4, at block 410, an available services search query is received from a potential services buyer. With reference to FIG. 8, at operation 1, the available services search module 830 receives a search query submitted from a potential services buyer. While in one embodiment of the invention the query is submitted through a web page as illustrated in FIG. 1A, in alternative embodiments of the invention the query is submitted differently (e.g., via text message, via email, via phone, etc.). Flow moves from block 410 to block 415 where the available services search module 830 parses the received search query to determine the search parameters. With reference to FIG. 1A, the search parameters are determined from the information entered in the available services search query field 110 and/or the location field 120. Flow moves from block 415 to block 420.

At block 420, the available services search module 830 determines whether a location was included in the received search query. If a location was not entered, then flow moves to block 422 where an alternative action is taken, and flow moves to block 425. For example, in some embodiments, the potential service buyer is prompted to enter in a location, while in other embodiments a default location is used. The default location may be determined in different ways in different embodiments (e.g., based on previous searches performed by the potential service buyer, based on the location information in the profile of the potential service buyer 880 (if that potential service buyer is registered), estimated based on the IP address used during the search query, based on GPS if the potential service buyer is accessing the trusted localized marketplace for peer-to-peer services using a GPS enabled device, etc.). In yet another embodiment, the available services search module 830 does not restrict its results based on location if one was not entered (i.e., the entire available services database is searched without regard to location). Flow moves from block 420 to block 425 if the search parameters indicate a location was entered in the search query.

At block 425, an available services database is searched based on the search parameters of the search query. With reference to FIG. 8, at operation 2, the available services search module 830 searches the available services database 810 based on the search parameters of the received search query. Flow moves from block 425 to block 430. At block 430, the result of the search query is displayed to the potential service buyer. In addition, an option to automatically post an entry in a wanted services database based on the information entered in the search query (e.g., the available services search query field 110 and/or the location filed 120) is also displayed to the potential service buyer (e.g., in case the results of the search query are not what the potential service buyer is looking for). With reference to FIG. 8, at operation 3, the available services search module 830 passes the result of the search to the display results search module 835 where the display results search module 835 displays the result to the potential service buyer. Flow moves from block 430 to block 435.

Figure 6:
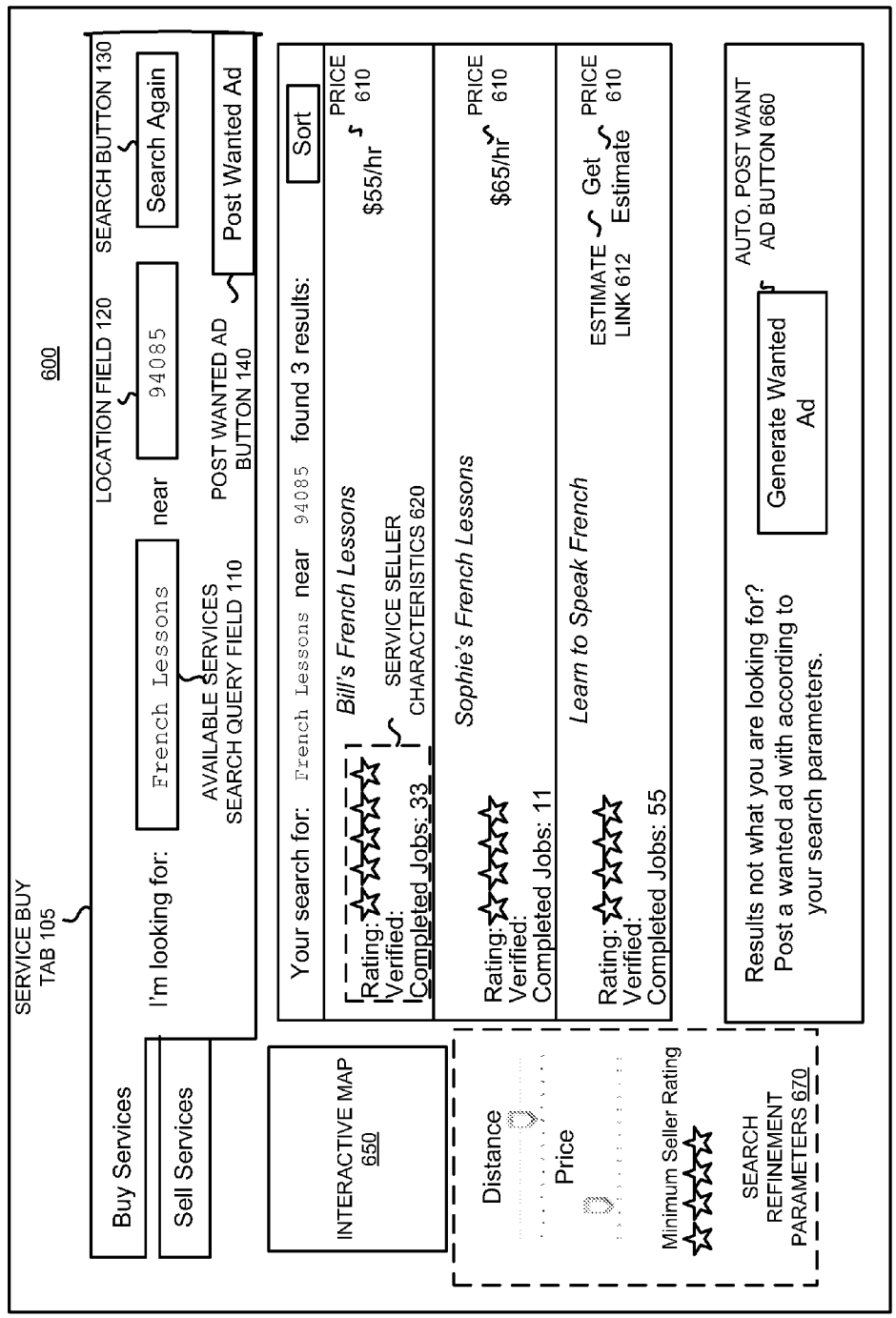
FIG. 6 illustrates an exemplary search result page responsive to a search of the available services database of the trusted localized peer-to-peer services marketplace according to one embodiment of the invention.

FIG. 6 illustrates an exemplary search result page 600 responsive to a search of the available services database according to one embodiment of the invention. The search result page 600 includes the service buy tab 105 described in reference to FIG. 1A. The search parameters described in reference to FIG. 1A are also illustrated in FIG. 6 (i.e., the potential service buyer has entered in "French Lessons" in the available services search query field 110 and has included the zip code 94085 in the location field 120). The search result page 600 illustrates that there is three available services that match the search query (Bill's French Lessons, Sophie's French Lessons, and Learn to Speak French) and the price result 610 of those services.

It should be noted that the service seller may need more information before supplying a price (e.g., if the service is for catering an event, the service seller may need to know how many people are expected to attend the event before supplying a price). In these cases, the price result 610 indicates that an estimate from the service seller is needed. For example, in the price result field 610 for Learn to Speak French, an estimate link 612 is displayed which directs the potential service buyer to an estimate page.

In some embodiments, the estimate page is similar to the page to post a wanted services ad as illustrated in FIG. 2 with the addition of a button to submit the request for an estimate from the selected service seller. Similarly as described with reference to FIG. 2, selection of the submit button 235 causes a wanted ad to be automatically generated and populated to the wanted services database. Some fields of the estimate page may be automatically populated based on the selected search result record and/or search query. For example, the description field 210 may be populated with the information entered in the available services search query field 110.

The search result page 600 also includes the interactive map 650 which illustrates the locations of the available services (e.g., the location of Bill's French Lessons, etc.) on the map. The interactive map 650 may provide directions to/from the matching available services.

As illustrated in FIG. 6, each matching entry also has one or more service seller characteristics 620 unique to a particular service seller. The service seller characteristics include a rating (the rating being generated from feedback from other service buyers), verification status, the amount of completed jobs, etc. According to one embodiment of the invention, service buyers may submit a review and/or rating of a service seller after a completed transaction. The rating of a service seller is calculated based on the submitted ratings from service buyers. According to one embodiment of the invention, the rating of a service seller is calculated using the following formulas. For less than 40 total ratings, the following formula is used, where T=the total number of reviews, M=the number of negative reviews, P=the number of positive reviews:

$$\left(\frac{(0M + N + 2P + 1)}{T + 1}\right) * 5$$

For 40 or more total ratings, the following formula is used:

$$\left(\frac{\sum_{i=1}^{i=T-20} 0M + N + 2P}{T - 20}\right) * 2.5 + \left(\frac{\sum_{i=T-19}^{i=T} 0M + N + 2P}{20}\right) * 2.5$$

Thus, each negative review is given a score of zero, each neutral review is given a score of one, and each positive review is given a score of two. Of course, it should be understood that different methods may be used to calculate the rating of the service seller in alternative embodiments of the invention.

The verification status characteristic includes different methods of verifying the identity and trustworthiness of the service seller. For example, service sellers may verify their name, email address, phone, address, and/or have a background check performed (including, but not limited to, a credit check, a criminal history check, a sexual offender database check, etc.) when registering with the trusted localized peer-to-peer services marketplace (or sometime thereafter). These characteristics are typically stored as part of a profile for the service seller which is created when the service seller registers with the trusted localized peer-to-peer services marketplace. All of these characteristics help in ensuring the trustworthiness of a service provider. It should be understood that the potential service buyer may include any of these verifications in the search query. For example, the potential service buyer may search for only those available services offered by service providers that have a current background check on file with the trusted localized peer-to-peer services marketplace. Although not illustrated in FIG. 6, the potential service buyer may read reviews and/or testimonials submitted by other buyers for each service provider listed.

The potential service buyer may refine the search results using the search refinement parameters 670. For example, the potential service buyer may refine the results of the search by distance, price, minimum seller rating, etc. The potential service buyer may also sort the results of search query by one or more search options (e.g., proximity, price, seller rating, number of jobs, verification, etc.).

The search result page 600 also includes the automatic post wanted ad button 660. When selected, the automatic post wanted ad button 660 generates a wanted ad for the potential service buyer based on the entered search parameters (the search parameters used when generating the search result page 600). Thus, the automatic post wanted ad button 660 allows the potential service buyer to quickly post a wanted service ad (e.g., in case the results of the search query are not what the potential service buyer is looking for). According to one embodiment of the invention, in order to select the automatic post wanted ad button, the potential service buyer must be logged into the trusted localized peer-to-peer service marketplace. It should be understood that the level of detail in an automatic post corresponds to the amount of information included in the original search query. However, it should also be understood that a potential service buyer may supplement the information from the original search query to increase the level of information in the wanted service ad. For example, in one embodiment of the invention, the potential service buyer is directed to a post wanted page (e.g., the post wanted page illustrated in FIG. 2) where the information from the original search query is pre-populated and the potential service buyer enters any remaining fields. In some embodiments the search result page 600 only includes the automatic post wanted ad button 600 when there is not a match based on the entered search parameters while in other embodiments the search result page 600 includes the automatic post wanted ad button 600 regardless of the search results.

Referring back to FIG. 4, at block 435, if the potential service buyer selects a service to purchase, then flow moves to block 455 where a transaction process is performed. With reference to FIG. 8, at operation 4A, the service buyer has selected an available service and the transaction module 850 begins processing that selection. The transaction module 850 includes the scheduling module 865 and optionally an escrow module 855. The scheduling module 865 may be used by the service sellers and service buyers to schedule a time and location for the service purchase. For example, the scheduling module 865 allows potential service buyers to automatically reserve available appointment times/dates of service sellers. The scheduling module 865 may include a calendaring system such that service buyers may reserve a specific available time and/or location for the service according to the schedule provided by the service buyer. For example, the calendaring system may graphically illustrate the availability of a service seller in providing the selected service. The calendaring system allows the potential service buyer to make a reservation request for one of the available times and the calendaring system automatically reserves (e.g., blocks off that time) of the selected service seller to provide the selected service to create a service appointment. The selected service server is then notified of the service appointment (e.g., via email, via text message, via phone, via private message, etc.) (e.g., through use of the notification module 870). FIG. 9 illustrates an exemplary calendaring system 900 according to one embodiment of the invention.

The escrow module 855 allows the trusted localized peer-to-peer service marketplace to hold money for the service in escrow until completion of the job as determined by the service buyer and the service seller. For example, in one embodiment of the invention, the service seller requires that the service buyer pay for the service in advance, the amount of money held in escrow by the trusted localized peer-to-peer service marketplace. The money will be held in escrow until released by the service buyer. For example, in one embodiment of the invention, the service buyer is obligated to release the funds after so many days after the completion of the job, unless the service buyer submits a dispute to the trusted localized peer-to-peer service marketplace. If the service buyer does not release the funds or submit a dispute, the trusted localized peer-to-peer service marketplace will automatically release the funds to the service seller. It should be understood that a service buyer has incentive to release the funds since the service seller has the ability to submit a review about the service buyer which may impact whether the service buyer can purchase services in the future.

According to one embodiment of the invention, the service seller is also required to put a certain amount of money into escrow for each job they have contracted to perform. If the service seller does not show up or cancels the service lately, the seller may forfeit that money put into escrow to the service buyer. If the service is performed, the money will be returned to the service seller.

Referring back to FIG. 4, if the service buyer does not select a service, then flow moves to block 440. At block 440, if the service buyer selects to automatically post a wanted ad, flow moves to block 450 where a wanted ad is automatically generated based on the information included in the received search query. If the service buyer does not want to post a wanted ad, then flow moves to block 445 where alternative action is taken. With reference to FIG. 8, if the service buyer selects to have a wanted ad automatically generated based on the search query (e.g., because of an undesirable search result), at operation 4B the post ad module 865 generates the ad and populates the wanted services database 820 with the information from the search query along with other information unique to that service buyer included in that service buyer's profile 880 (e.g., name, location, email address, verification status, and/or rating, etc.). The service seller may supplement the information from the original search query to increase the level of information in the available service ad. For example, in one embodiment of the invention, the service seller is directed to a post available service page (e.g., the post available service page illustrated in FIG. 3) where the information from the original search query is pre-populated and the service seller enters any remaining fields.

Figure 5:
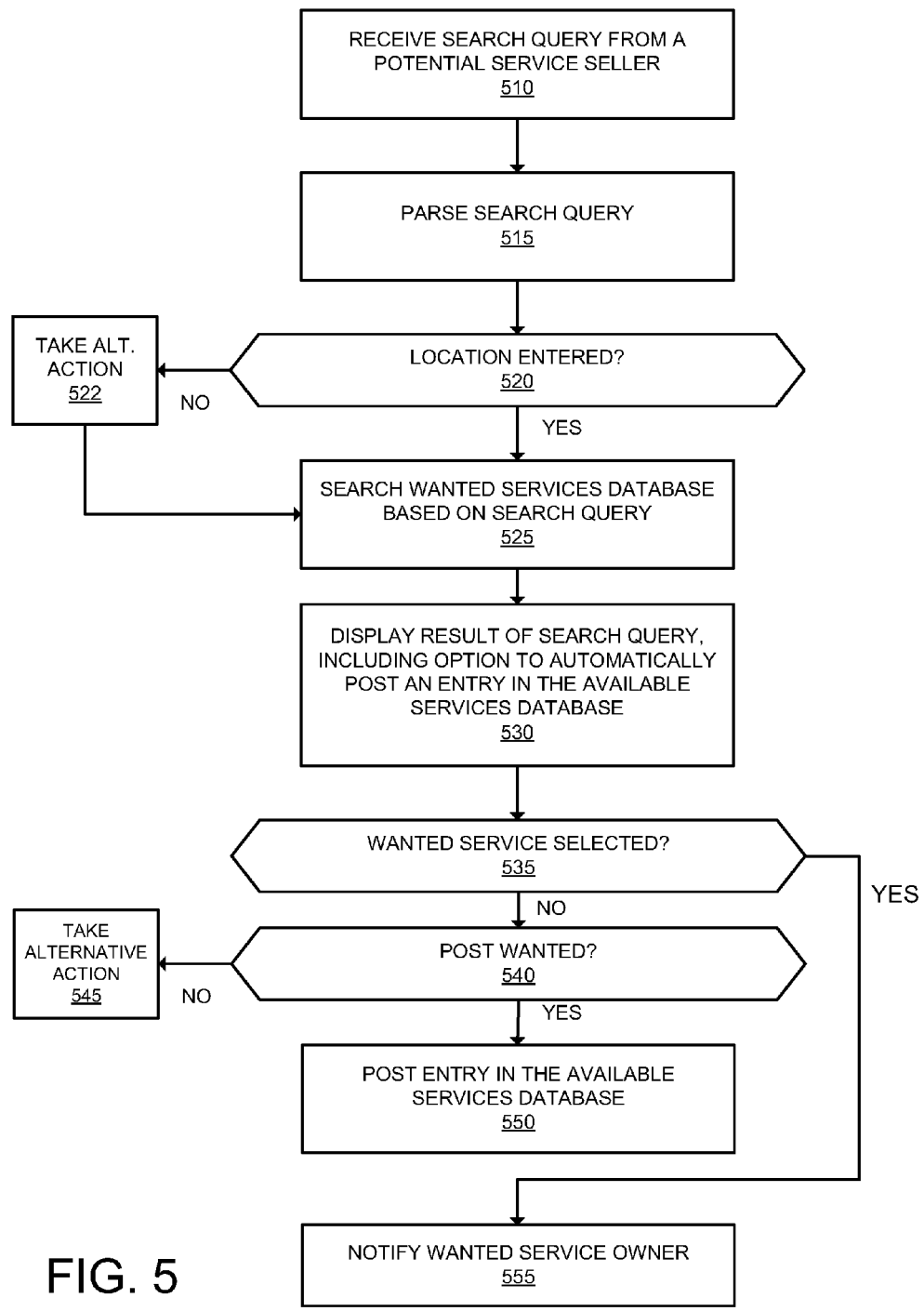
FIG. 5 is a flow diagram illustrating an exemplary method for a service seller to use the trusted localized peer-to-peer services marketplace according to one embodiment of the invention.

FIG. 5 is a flow diagram illustrating an exemplary method for a service seller to use the trusted localized marketplace for peer-to-peer services according to one embodiment of the invention. The operations of FIG. 5 will be described with reference to the exemplary embodiment of FIG. 8. However, it should be understood that the operations of FIG. 5 can be performed by embodiments of the invention other than those discussed with reference to FIG. 8, and the embodiments discussed with reference to FIG. 8 can perform operations different than those discussed with reference to FIG. 5.

According to one embodiment of the invention, the trusted localized peer-to-peer services marketplace 800 (illustrated in FIG. 8) performs the operations of FIG. 5. With reference to FIG. 4, at block 510, a wanted ad search query is received from a services seller. With reference to FIG. 8, at operation 5, the wanted services search module 840 receives a search query submitted from the services seller. While in one embodiment of the invention the query is submitted through a web page as illustrated in FIG. 1B, in alternative embodiments of the invention the query is submitted differently (e.g., via text message, via email, via phone, etc.). Flow moves from block 510 to block 515 where the wanted services search module 840 parses the received search query to determine the search parameters. With reference to FIG. 1B, the search parameters are determined from the information entered in the wanted ad search query field 150 and/or the location field 160. Flow moves from block 515 to block 520.

At block 520, the wanted services search module 840 determines whether a location was included in the received search query. If a location was not entered, then flow moves to block 522 where alternative action is taken and flow moves to block 525. For example, in some embodiments, the services seller is prompted to enter in a location, while in other embodiments a default location is used. The default location may be determined in different ways in different embodiments (e.g., based on previous searches performed by the services seller, based on the location information in the profile of the services seller 885 (if that services seller is registered), estimated based on the IP address used during the search query, based on GPS if the services seller is accessing the trusted localized marketplace for peer-to-peer services using a GPS enabled device, etc.). In yet another embodiment, the wanted services search module 840 does not restrict its results based on location if one was not entered (i.e., the entire wanted services database is searched without regard to location). Flow moves from block 520 to block 525 if the search parameters indicate a location was entered in the search query.

At block 525, a wanted services database is searched based on the search parameters of the search query. With reference to FIG. 8, at operation 6, the wanted services search module 840 searches the wanted services database 820 based on the search parameters of the received search query. Flow moves from block 525 to block 530. At block 530, the result of the search query is displayed to the service seller. In addition, an option to automatically post an entry in the available services database based on the information entered in the search query (e.g., the information entered in the wanted ad search query field 150 and/or the location field 160) is also displayed to the services seller. With reference to FIG. 8, at operation 7, the wanted services search module 840 passes the result of the search to the display results search module 835 where the display results search module 835 displays the result to the service seller. Flow moves from block 530 to block 535.

Figure 7:
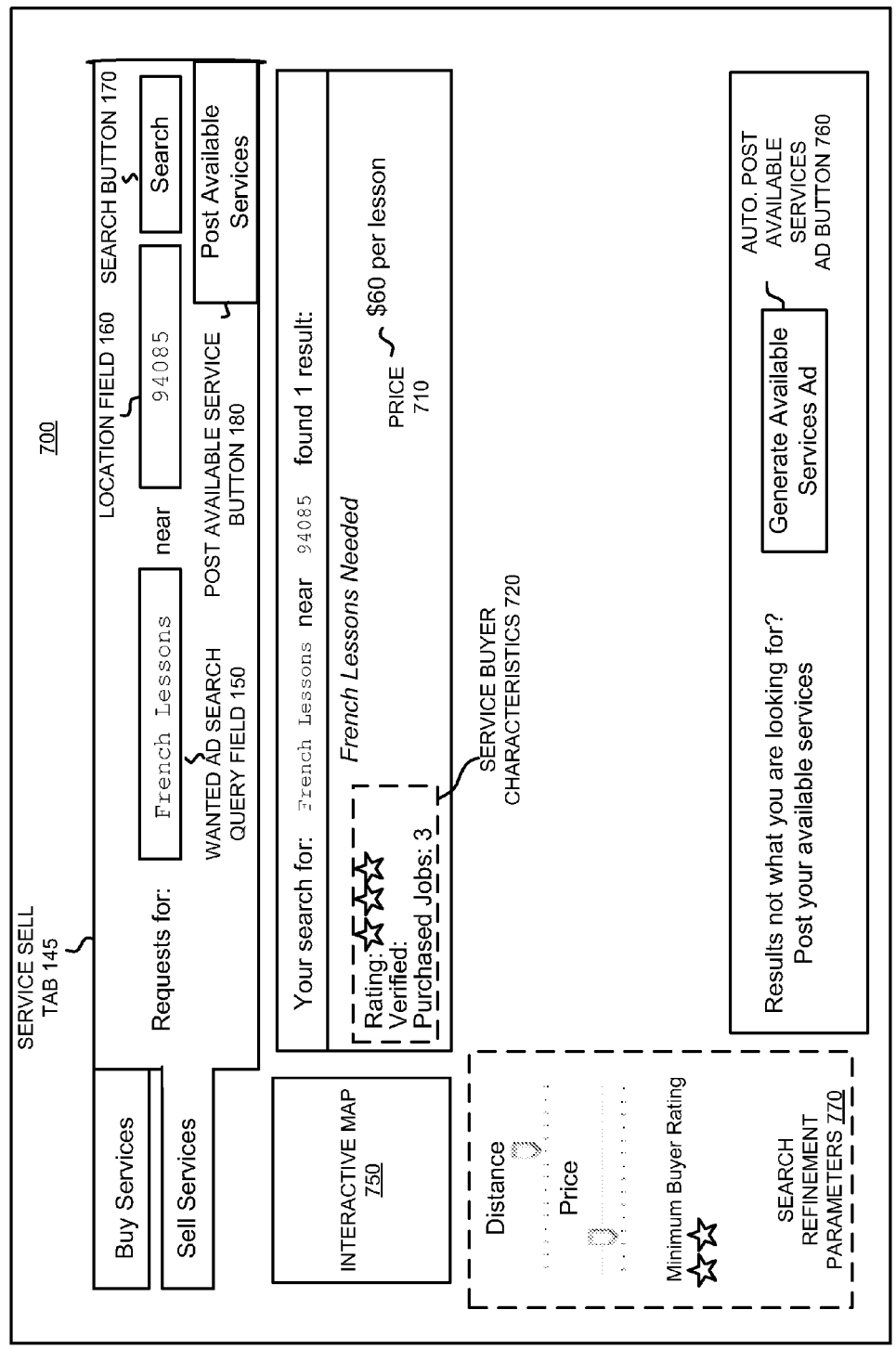
FIG. 7 illustrates an exemplary search result page responsive to a search of the wanted services database of the trusted localized peer-to-peer services marketplace according to one embodiment of the invention.

FIG. 7 illustrates an exemplary search result page 700 responsive to a search of the wanted services database according to one embodiment of the invention. The search result page 700 includes the service sell tab 145 described in reference to FIG. 1B. The search parameters described in reference to FIG. 1B are also illustrated in FIG. 7 (i.e., the service seller has entered in "French Lessons" in the wanted ad search query field 150 and has included the zip code 94085 in the location field 160). The search result page 700 illustrates that there is one wanted service that matches the search query ("French Lessons Needed") and the price 710 that the service buyer wants to spend. The search result page 700 also includes the interactive map 750 which illustrates the locations of the wanted services (e.g., the location of the service buyers) on the map. The interactive map 750 may provide directions to/from the matching wanted services.

Each entry matching the parameters of the search query also has one or more service buyer characteristics 720 unique to the service buyers. The service buyer characteristics 720 include a rating (the rating being generated from feedback from other service sellers about the service buyer), verification status, the amount of purchased jobs, etc. These characteristics are typically stored as part of a profile for the service buyer which is created when the service buyer registers with the trusted localized peer-to-peer services marketplace. According to one embodiment of the invention, service sellers may submit a review and/or rating of a service buyer after a completed transaction. The rating of a service buyer is calculated based on the submitted ratings from service sellers. According to one embodiment of the invention, the rating of a service buyer is substantially similar to the rating of a service seller. For example, for less than 40 total ratings, the following formula is used, where T=the total number of reviews, M=the number of negative reviews, N=the number of neutral reviews, P=the number of positive reviews:

$$\left(\frac{(0M+N+2P+1)}{T+1}\right)*5$$

For 40 or more total ratings, the following formula is used:

$$\left(\frac{\sum_{i=1}^{i=T-20} 0M+N+2P}{T-20}\right)*2.5 + \left(\frac{\sum_{i=T-19}^{i=T} 0M+N+2P}{20}\right)*2.5$$

Thus, each negative review is given a score of zero, each neutral review is given a score of one, and each positive review is given a score of two. Of course, it should be understood that different methods may be used to calculate the rating of the service buyer in alternative embodiments of the invention.

The verification status characteristic includes different methods of verifying the identity and trustworthiness of the service buyer. For example, service buyers may verify their name, email address, phone, address, and/or have a background check performed (including a credit check, a criminal history check, a sexual offender database check, etc.) when registering with the trusted localized peer-to-peer services marketplace (or sometime thereafter). All of these characteristics help in ensuring the service seller that the service buyer is trustworthy. It should be understood that the service seller may include any of these verifications in the search query. For example, the service seller may search for only those service buyers that have a current background check on file with the trusted localized peer-to-peer services marketplace. As one example, if the service seller provides childcare services (e.g., babysitting), the service seller may require that all potential service buyers have a current background check on file with the trusted localized peer-to-peer services marketplace. Although not illustrated in FIG. 7, the service seller may read reviews and/or testimonials of the service buyers submitted by other service sellers.

The service seller may refine the search results using the search refinement parameters 770. For example, the service seller may refine the results of the search by distance, price, minimum buyer rating, etc. The service seller may also sort the results of search query by one or more search options (e.g., proximity, price, buyer rating, number of jobs purchased, verification, etc.).

The search result page 700 also includes the automatic post available services ad button 760. When selected, the automatic post available services ad button 760 generates an available services ad for the service seller based on the entered search parameters (the search parameters used when generating the search result page 700). Thus, the automatic post available services ad button 760 allows the service seller to quickly post an available services ad. According to one embodiment of the invention, in order to generate an automatic post available services ad, the service seller is required to be logged into the trusted localized peer-to-peer service marketplace. It should be understood that the level of detail in an automatic post corresponds to the amount of information included in the original search query. However, it should also be understood that a service seller may supplement the information from the original search query to increase the level of information in the available services ad. In some embodiments the search result page 700 only includes the automatic post available services ad button 760 when there is not a match based on the entered search parameters while in other embodiments the search result page 700 includes the automatic post available services ad button 760 regardless of the search results.

Referring back to FIG. 5, at block 535, if the service seller selects a wanted service, flow moves to block 555 where the wanted service owner is notified (e.g., through email, telephone call, text message, private message, etc.). With reference to FIG. 8, at operation 8A, the service seller has selected a wanted service and the notification module 870 transmits a notification (operation 11) to the wanted service owner.

If the service seller does not select a wanted service, then flow moves to block 540. At block 540, if the service seller selects to automatically post an available services ad, flow moves to block 550 where an available services ad is automatically generated based on the information included in the received search query and the available services database 810 is populated with that information. If the service seller does not want to post an available services ad, then flow moves to block 545 where alternative action is taken (e.g., the process ends). With reference to FIG. 8, if the service seller selects to have an available services ad automatically generated based on the search query (e.g., because of an undesirable search result), at operation 8B the post ad module 865 generates the ad and populates the available services database 810 with the information from the search query, along with other information unique to that service seller in that service seller's profile 885 (e.g., name, location, email address, verification status, and/or rating, etc.).

FIG. 8 also includes the automated matching engine 860 which periodically executes searches on the available services database 810 and the wanted services database 820 (operations 9A and 9B respectively). For example, service sellers and/or service buyers may register for services they deem interesting and may wish to receive notifications (e.g., emails, phone calls, text messages, iPhone notifications, etc.) when those services are available and/or wanted. These notification registrations may be stored in the profiles of the user (e.g., in the buyer profiles 880 and the seller profiles 885). Periodically (e.g., once a day, once an hour, etc.) the automated matching engine 860 performs a search on the available services database 810 and/or the wanted services database 820 and provides notification(s) of matches to the interested users. Upon determining there is a match, at operation 10, the automated matching engine 860 transmits a matching entry to the notification module 870. At operation 11, the notification module transmits notifications to the interested parties.

Registering for notifications may be used in lieu of, or in addition to, submitting a wanted services ad or an available services ad. For example, if a service buyer searches for "French lessons" near the zip code 94085, and does not receive a result, and for some reason does not want to post an ad for "French lessons," but has registered to receive notifications for "French lessons" near the zip code 94085, that service buyer will receive notification(s) when/if service seller(s) begin offering that service. For example, registering for notifications for "French lessons" near the zip code 94085 causes the automated matching engine 860 to periodically execute the search "French lessons near 94085" on the available services database 810. If a service seller begins to provide that service (French lessons near 94085), a notification will be sent to the service buyer.

The automated matching engine 860 may also execute a search on the available services database 810 responsive to a potential service buyer requesting an estimate for a selected service from a service seller based on the information included in the service estimate request (e.g., description, price, time, location, verification status, etc.). Services and/or service providers who offer services that match (those which may interest the potential service buyer based on the service estimate request) may then be transmitted and/or displayed to the potential service buyer.

In addition, the automated matching engine 860 may also execute a search on the available services database 810 responsive to a service seller responding to a service estimate request of a potential service buyer based on the information included in the service estimate response (e.g., description, price, time, location, verification status, etc.). Services and/or service providers who offer services that match (those which may interest the potential service buyer based on the service estimate request) may then be transmitted and/or displayed to the potential service buyer.

Although not illustrated in FIG. 8, the trusted localized peer-to-peer services marketplace 800 also includes a profile manager that includes a registration module to allow users (service sellers and service buyers) to register with the marketplace 800 (including supplying contact information) and register for services provided by the marketplace 800 (e.g., notification registration services). The profile manager also manages the buyer profiles 880 and the seller profiles 885 including managing service buyer characteristics and service seller characteristics (e.g., updating and calculating buyer and seller ratings, maintaining the verification status of buyers and sellers, maintaining the amount of purchased/completed jobs, etc.).

Additionally, in some embodiments of the invention the trusted localized peer-to-peer services marketplace implements RSS feeds so that a service seller and/or service buyer has the results pushed to an RSS reader.

In one embodiment of the invention, the trusted localized peer-to-peer services marketplace described herein (e.g., trusted localized peer-to-peer services marketplace 800) stores each search performed by a user (the searches for available services and the searches for wanted services). In another embodiment, only those searches performed by registered users are stored. The searches of the available services may be used by service sellers to estimate demand for their services (e.g., both time and location). The searches of the wanted services may be used by the service sellers to estimate the supply of those services. These search results, and the analysis, may be provided to the service sellers at a price. For example, a service seller may be able to determine that there is a large amount of search activity for yard work on particular days of the week and very little on other days of the week. Service sellers may use this information when scheduling their availability.

In one embodiment of the invention, advertisements for goods that correspond with the searched services are displayed along with the search results.

In one embodiment of the invention, service sellers and/or service buyers may pay to have their listings displayed in a more prominent location in the search results page.

In one embodiment of the invention, recommendations are provided to users of the trusted localized peer-to-peer services marketplace based on their search history. For example, if a service buyer has purchased golf lessons from a particular service seller, the trusted localized peer-to-peer services marketplace may recommend to the service buyer golf lessons from other service sellers, other available services related to sports, etc. As another example, if a service seller has provided jobs for yard work in the past, the trusted localized peer-to-peer services marketplace may recommend other yard work jobs to that service seller.

Figure 10:
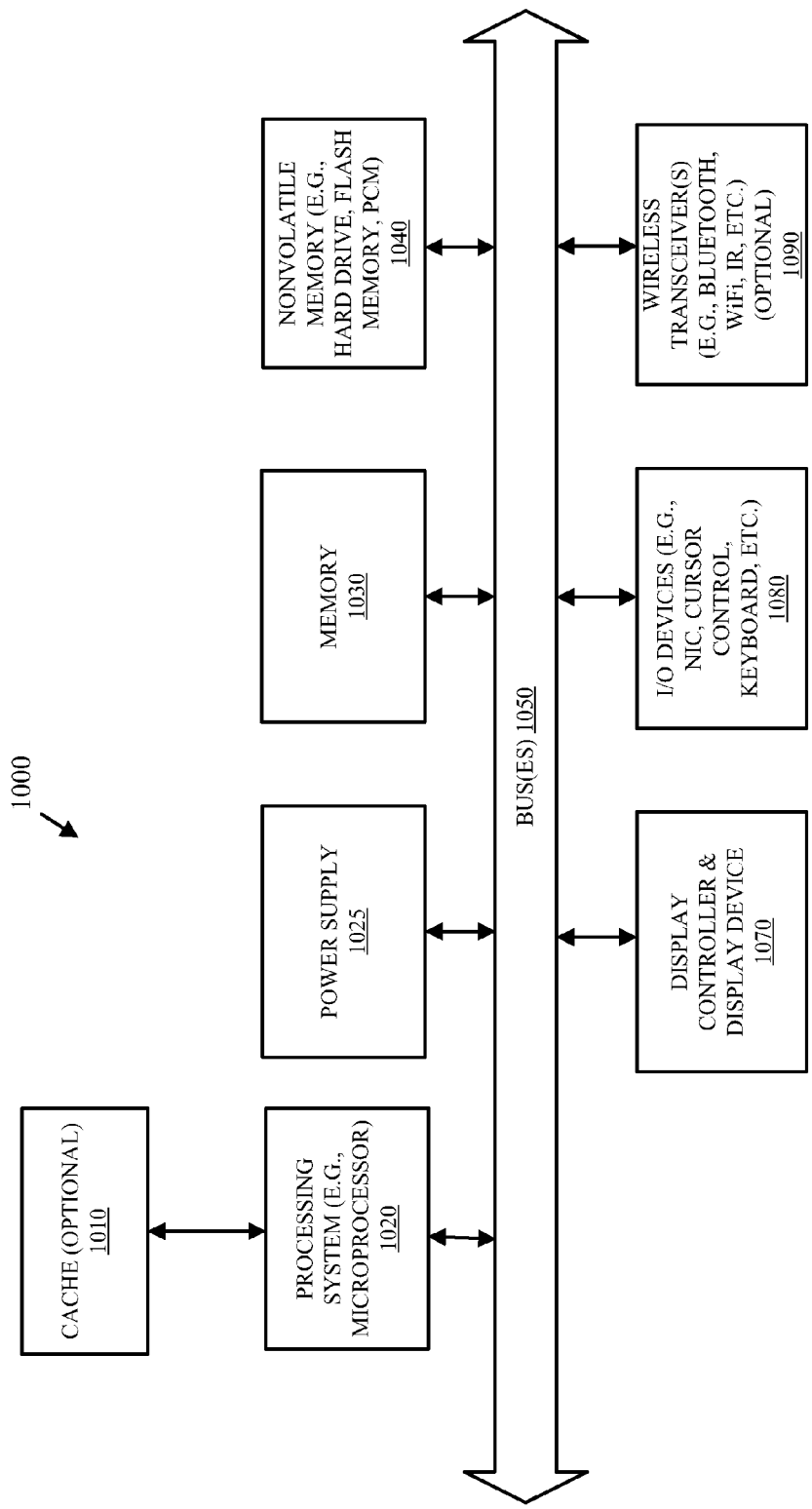
FIG. 10 is a block diagram illustrating an exemplary computing device the implements the trusted localized peer-to-peer services marketplace according to one embodiment of the invention.

FIG. 10 is a block diagram illustrating an exemplary computer system which may be used in some embodiments of the invention. For example, the exemplary architecture of the computer system 1000 may implement a trusted localized peer-to-peer services marketplace. It should be understood that while FIG. 10 illustrates various components of a computer system, it is not intended to represent any manner of interconnecting the components as such details are not germane to the present invention. It will be appreciated that other computer systems that have fewer components or more components may also be used with the present invention.

As illustrated in FIG. 10, the computer system 1000, which is a form of a data processing system, includes the bus(es) 1050 which is coupled with the processing system 1020, power supply 1025, memory 1030, and the nonvolatile memory 1040 (e.g., a hard drive, flash memory, Phase-Change Memory (PCM), etc.). The bus(es) 1050 may be connected to each other through various bridges, controllers, and/or adapters as is well known in the art. The processing system 1020 may retrieve instruction(s) from the memory 1030 and/or the nonvolatile memory 1040, and execute the instructions to perform operations as described above. The bus 1050 interconnects the above components together and also interconnects those components to the display controller & display device 1070, Input/Output devices 1080 (e.g., NIC (Network Interface Card), a cursor control (e.g., mouse, touchscreen, touchpad, etc.), a keyboard, etc.), and the optional wireless transceiver(s) 1090 (e.g., Bluetooth, WiFi, Infrared, etc.).

While FIG. 10 illustrates a single exemplary computer system implementing embodiments of the invention described herein, in alternative embodiments of the invention the trusted localized peer-to-peer services marketplace is implemented by a plurality of computer systems (e.g., performed by a series of cluster nodes).

While the flow diagrams in the figures show a particular order of operations performed by certain embodiments of the invention, it should be understood that such order is exemplary (e.g., alternative embodiments may perform the operations in a different order, combine certain operations, overlap certain operations, etc.)

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A machine-readable storage medium that provides instructions that, if executed by a processor, will cause said processor to perform operations for a trusted localized peer-to-peer services marketplace, the operations comprising:
   receiving a search query from a potential service buyer, the search query including a plurality of parameters, wherein the potential service buyer is associated with a profile for the trusted localized peer-to-peer services marketplace that is associated with at least the following:
      a set of one or more reviews submitted by one or more service sellers, and
      a rating of that potential service buyer that is based on the set of reviews submitted by the one or more service sellers including a total number of reviews of the potential service buyer, a number of negative reviews of the potential service buyer, a number of positive reviews of the potential service buyer, and a number of neutral reviews of the potential service buyer;
   wherein negative reviews are given a score less than neutral reviews, wherein neutral reviews are given a score less than positive reviews, and wherein a first portion of the first set of reviews that are made earlier in time as compared to a second portion of the first set of reviews is weighed less heavily in the rating of the potential service buyer;
   wherein the first portion of the first set of reviews is given a value at least based on,
      the sum of, the score given for the number of negative reviews of the first portion of the first set of reviews, the score given for the number of neutral reviews of the first portion of the first set of reviews, and the score given for the number of positive reviews of the first portion of the first set of reviews,
      that sum divided by the number of reviews of the first portion of the first set of reviews thereby generating a first intermediate number, and
      that first intermediate number multiplied by a number greater than one;
   wherein the second portion of the first set of reviews is given a value at least based on,
      the sum of, the score given for the number of negative reviews of the second portion of the first set of reviews, the score given for the number of neutral reviews of the second portion of the first set of reviews, and the score given for the number of positive reviews of the second portion of the first set of reviews,
      that sum divided by the number of reviews of the second portion of the first set of reviews thereby generating a second intermediate number, and
      that second intermediate number multiplied by a number greater than one;
   wherein the rating of that potential service buyer includes a combination of the value given to the first portion of the first set of reviews and the value given to the second portion of the first set of reviews;
   parsing the search query to identify the plurality of parameters, the plurality of parameters at least including a category of service wanted and a location where the service wanted is desired;
   searching an available services database based on the plurality of parameters of the search query, wherein the available services database is populated with available services provided by a plurality of service sellers, wherein each one of the service sellers has a service seller profile for the trusted localized peer-to-peer services marketplace that is associated with at least the following:
      a description of a service that service seller offers,
      contact information for that service seller,
      a location of the service seller,
      a location where the service offered by the service seller is provided, and a set of one or more reviews submitted by one or more other service buyers;
   transmitting one or more notifications to one or more service sellers that offer a service that matches at least the category of service wanted and the location where the service wanted is desired based on a result of the searching of the available services database; and
   communicating, to the potential service buyer, information regarding one or more service sellers that match at least the category of service wanted and the location where the service wanted is desired based on a result of the searching of the available services database, wherein the communicated information includes, for each of the one or more services sellers that match at least the category of service wanted and the location where the service wanted is desired, at least the following:
      the description of the service that service seller offers,
      contact information for that service seller,
      the location of the service seller,
      the location where the service offered by the service seller is provided, and
      a rating of that service seller that is based on the set of reviews submitted by the one or more other service buyers including a total number of reviews of that service seller, a number of negative reviews of that service seller, and a number of positive reviews of that service seller.

2. The machine-readable storage medium of claim 1, wherein the operations further comprise:
   receiving a selection of one of the services offered by one of the service sellers from the potential service buyer;
   displaying an interactive calendar that indicates the availability of the selected service seller for the selected service;
   receiving a reservation request for the selected service during one of the available times of the selected service seller from the potential service buyer;
   reserving the requested time for the service seller to provide the selected service to the potential service buyer to create a service appointment; and
   notifying the selected service seller of the service appointment.

3. The machine-readable storage medium of claim 1, wherein the communicated information further includes, for each of the one or more services sellers that match at least the category of service wanted and the location where the service wanted is desired, the following:
   an estimate of a price for the service offered by that service seller; and
   one or more reviews of that service seller submitted by one or more other service buyers.

4. The machine-readable storage medium of claim 1, wherein each service seller profile for each service seller is further associated with a completed background check for the trusted localized peer-to-peer services marketplace.

5. The machine-readable storage medium of claim 4, wherein the background check includes a sexual offender database check.

6. The machine-readable storage medium of claim 1, wherein the contact information for each service seller is verified as being accurate.

7. The machine-readable storage medium of claim 1, wherein the plurality of parameters further includes a price that the potential service buyer wants to spend for the service wanted.

8. The machine-readable storage medium of claim 1, wherein the rating of that service seller is further based on a number of neutral reviews of that service seller, wherein negative reviews are given a score less than neutral reviews, wherein neutral reviews are given a score less than positive reviews, wherein a first portion of the second set of reviews that are made earlier in time as compared to a second portion of the second set of reviews is weighed less heavily in the rating of that service seller,
- wherein the first portion of the second set of reviews is given a value at least based on,
  - the sum of, the score given for the number of negative reviews of the first portion of the second set of reviews, the score given for the number of neutral reviews of the first portion of the second set of reviews, and the score given for the number of positive reviews of the first portion of the second set of reviews,
  - that sum divided by the number of reviews of the first portion of the second set of reviews,
- wherein the second portion of the second set of reviews is given a value at least based on,
  - the sum of, the score given for the number of negative reviews of the second portion of the second set of reviews, the score given for the number of neutral reviews of the second portion of the second set of reviews, and the score given for the number of positive reviews of the second portion of the second set of reviews,
  - that sum divided by the number of reviews of the second portion of the second set of reviews, and
- wherein the rating of that service seller incorporates the value given to the first portion of the second set of reviews and the value given to the second portion of the second set of reviews.

9. A method performed on a trusted localized peer-to-peer services marketplace computing system, comprising:
receiving a search query from a potential service buyer, the search query including a plurality of parameters, wherein the potential service buyer is associated with a profile for the trusted localized peer-to-peer services marketplace that is associated with at least the following:
  a set of one or more reviews submitted by one or more service sellers, and
  a rating of that potential service buyer that is based on the set of reviews submitted by the one or more service sellers including a total number of reviews of the potential service buyer, a number of negative reviews of the potential service buyer, a number of positive reviews of the potential service buyer, and a number of neutral reviews of the potential service buyer;
  wherein negative reviews are given a score less than neutral reviews, wherein neutral reviews are given a score less than positive reviews, and wherein a first portion of the first set of reviews that are made earlier in time as compared to a second portion of the first set of reviews is weighed less heavily in the rating of the potential service buyer;
  wherein the first portion of the first set of reviews is given a value at least based on,
    the sum of, the score given for the number of negative reviews of the first portion of the first set of reviews, the score given for the number of neutral reviews of the first portion of the first set of reviews, and the score given for the number of positive reviews of the first portion of the first set of reviews,
    that sum divided by the number of reviews of the first portion of the first set of reviews thereby generating a first intermediate number, and
    that first intermediate number multiplied by a number greater than one;
  wherein the second portion of the first set of reviews is given a value at least based on,
    the sum of, the score given for the number of negative reviews of the second portion of the first set of reviews, the score given for the number of neutral reviews of the second portion of the first set of reviews, and the score given for the number of positive reviews of the second portion of the first set of reviews,
    that sum divided by the number of reviews of the second portion of the first set of reviews thereby generating a second intermediate number, and
    that second intermediate number multiplied by a number greater than one;
  wherein the rating of that potential service buyer includes a combination of the value given to the first portion of the first set of reviews and the value given to the second portion of the first set of reviews;
parsing the search query to identify the plurality of parameters, the plurality of parameters at least including a category of service wanted and a location where the service wanted is desired;
searching an available services database based on the plurality of parameters of the search query, wherein the available services database is populated with available services provided by a plurality of service sellers, wherein each one of the service sellers has a service seller profile for the trusted localized peer-to-peer services marketplace that is associated with at least the following:
  a description of a service that service seller offers,
  contact information for that service seller,
  a location of the service seller,
  a location where the service offered by the service seller is provided, and
  a set of one or more reviews submitted by one or more other service buyers;
transmitting one or more notifications to one or more service sellers that offer a service that matches at least the category of service wanted and the location where the service wanted is desired based on a result of the searching of the available services database; and
communicating, to the potential service buyer, information regarding one or more service sellers that match at least the category of service wanted and the location where the service wanted is desired based on a result of the searching of the available services database, wherein the communicated information includes, for each of the one or more services sellers that match at least the category of service wanted and the location where the service wanted is desired, at least the following:
  the description of the service that service seller offers,
  contact information for that service seller,
  the location of the service seller, the location where the service offered by the service seller is provided, and a rating of that service seller that is based on the set of reviews submitted by the one or more other service buyers including a total number of reviews of that service seller, a number of negative reviews of that service seller, and a number of positive reviews of that service seller.

10. The method of claim 9, further comprising:
receiving a selection of one of the services offered by one of the service sellers from the potential service buyer;
displaying an interactive calendar that indicates the availability of the selected service seller for the selected service;
receiving a reservation request for the selected service during one of the available times of the selected service seller from the potential service buyer;
reserving the requested time for the service seller to provide the selected service to the potential service buyer to create a service appointment; and
notifying the selected service seller of the service appointment.

11. The method of claim 9, wherein the communicated information further includes, for each of the one or more services sellers that match at least the category of service wanted and the location where the service wanted is desired, the following:
an estimate of a price for the service offered by that service seller; and
one or more reviews of that service seller submitted by one or more other service buyers.

12. The method of claim 9, wherein each service seller profile for each service seller is further associated with a completed background check for the trusted localized peer-to-peer services marketplace.

13. The method of claim 12, wherein the background check includes a sexual offender database check.

14. The method of claim 9, wherein the contact information for each service seller is verified as being accurate.

15. The method of claim 9, wherein the plurality of parameters further includes a price that the potential service buyer wants to spend for the service wanted.

16. The method of claim 9, wherein the rating of that service seller is further based on a number of neutral reviews of that service seller, wherein negative reviews are given a score less than neutral reviews, wherein neutral reviews are given a score less than positive reviews, wherein a first portion of the second set of reviews that are made earlier in time as compared to a second portion of the second set of reviews is weighed less heavily in the rating of that service seller,
wherein the first portion of the second set of reviews is given a value at least based on,
the sum of, the score given for the number of negative reviews of the first portion of the second set of reviews, the score given for the number of neutral reviews of the first portion of the second set of reviews, and the score given for the number of positive reviews of the first portion of the second set of reviews,
that sum divided by the number of reviews of the first portion of the second set of reviews,
wherein the second portion of the second set of reviews is given a value at least based on,
the sum of, the score given for the number of negative reviews of the second portion of the second set of reviews, the score given for the number of neutral reviews of the second portion of the second set of reviews, and the score given for the number of positive reviews of the second portion of the second set of reviews,
that sum divided by the number of reviews of the second portion of the second set of reviews, and
wherein the rating of that service seller incorporates the value given to the first portion of the second set of reviews and the value given to the second portion of the second set of reviews.

* * * * *